United States Patent [19]

Shimizu

[11] Patent Number: 5,748,340
[45] Date of Patent: May 5, 1998

[54] IMAGE READING APPARATUS CAPABLE OF RAPID TRANSITION FROM A STANDBY MODE TO A STABLE OPERATIONAL MODE

[75] Inventor: Mitsuo Shimizu, Ebina, Japan

[73] Assignee: Fuji Xerox Co., Ltd., Tokyo, Japan

[21] Appl. No.: 570,601

[22] Filed: Dec. 11, 1995

[30] Foreign Application Priority Data

Dec. 16, 1994 [JP] Japan .................. 6-312829

[51] Int. Cl.⁶ .................................................. H04N 1/04
[52] U.S. Cl. ............................................ 358/482; 358/483
[58] Field of Search ................................... 358/482–483; 348/257, 272, 298, 303–304, 311–313, 673, 677, 689, 691

[56] References Cited

U.S. PATENT DOCUMENTS

| | | | |
|---|---|---|---|
| 4,197,557 | 4/1980 | Tuma et al. | 358/34 |
| 4,473,839 | 9/1984 | Noda | 358/41 |
| 4,589,025 | 5/1986 | Monahan et al. | 358/213 |
| 5,018,012 | 5/1991 | Tsuji | 358/171 |
| 5,329,312 | 7/1994 | Boisvert et al. | 348/256 |

FOREIGN PATENT DOCUMENTS

A-63-196158  8/1988  Japan.

Primary Examiner—Edward L. Coles, Sr.
Assistant Examiner—Stephen Brinich
Attorney, Agent, or Firm—Oliff & Berridge, PLC

[57] ABSTRACT

In an image reading apparatus arranged such that the supply of a drive clock signal CCD-CLK to a CCD solid-state imaging device is stopped during a standby period when an image is not read, during the standby period a high-level control signal CCDEN is generated by a clock-generating circuit, and is imparted to the CCD solid-state imaging device through an OR circuit and an inverter 14 so as to hold the drive clock signal CCD-CLK at a low level, thereby holding an output signal level of the CCD solid-state imaging device at a d.c. output bias level.

3 Claims, 4 Drawing Sheets

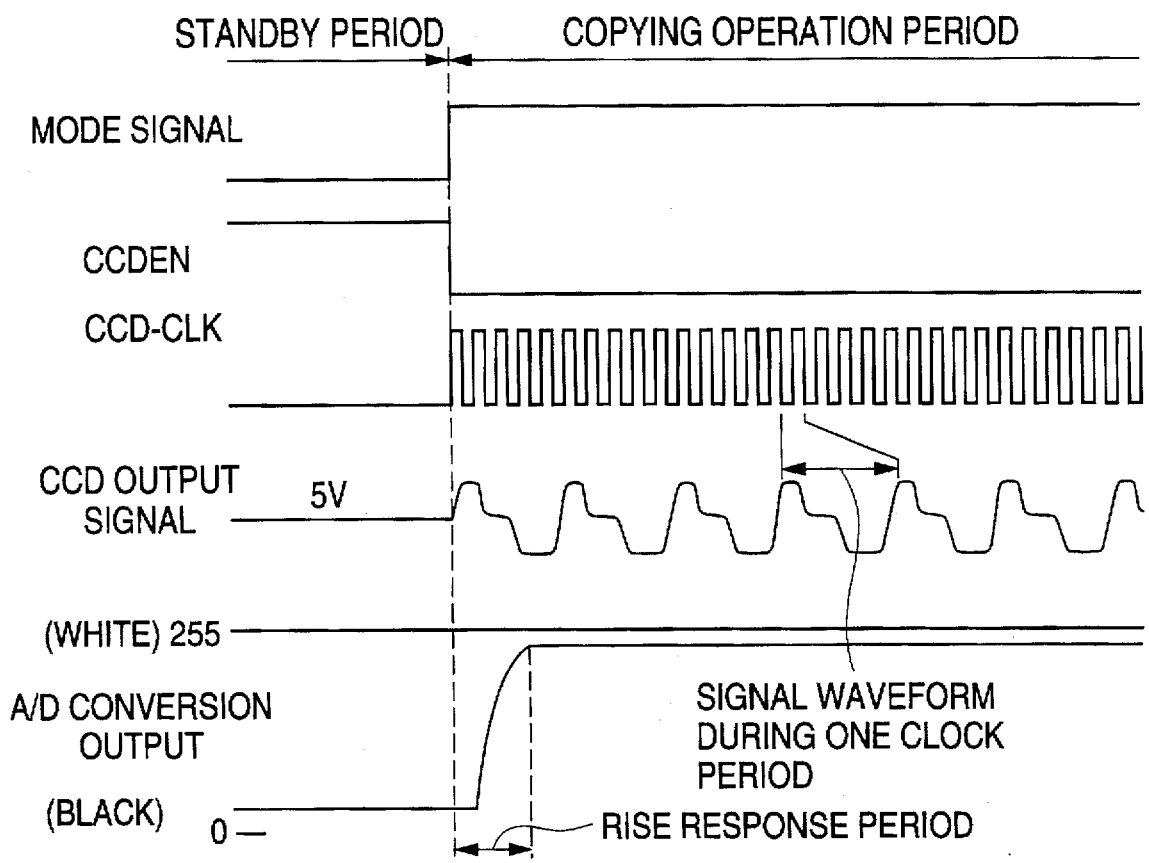
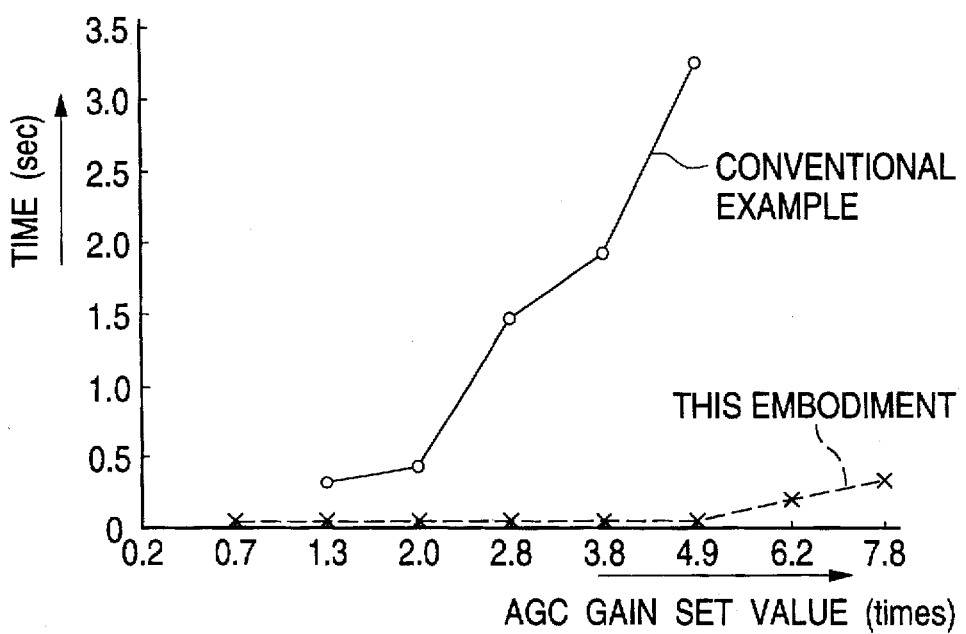
FIG. 4

IMAGE READING APPARATUS CAPABLE OF RAPID TRANSITION FROM A STANDBY MODE TO A STABLE OPERATIONAL MODE

BACKGROUND OF THE INVENTION

1. Field of the Invention

The present invention relates to an image reading apparatus, and more particularly to an image reading apparatus, such as a digital copying machine, for reading an image by using a photoelectric conversion element for converting an optical image obtained by applying light to an object, such as an original, into an electrical signal.

2. Description of the Related Art

In recent years, digital copying machines for copying an image onto a medium, such as paper, by converting an optical image obtained by applying light to an object, such as an original, into an electrical signal and by digitizing it have been developed and put to commercial use. By using a photoelectric conversion element such as a CCD solid-state imaging device, this type of image reading apparatus converts an optical image based on incident light from an original into an analog electrical signal, effects signal processing, such as amplification, with respect to that analog electrical signal by a signal processing circuit, and then converts the analog electrical signal into a digital electrical signal.

In image reading apparatuses, such as digital copying machines, a measure is adopted to suppress heat generation by reducing unnecessary power consumption by a CCD solid-state imaging device and its drive circuit and the like by stopping the supply of a drive clock signal for driving the CCD solid-state imaging device during a standby period when the reading of an image is not carried carried out (e.g., refer to Japanese Patent Unexamined Publication No. Sho 63-196158). That is, as shown in the timing chart in FIG. 7, the supply of a drive clock signal CCD-CLK to a CCD solid-state imaging device is stopped during the standby period, and the supply of the drive clock signal CCD-CLK is started in response to a copying start command so as to drive the CCD solid-state imaging device. The drive clock signal CCD-CLK referred to herein is a general term for various clock pulses including a read pulse by which a signal charge stored in each pixel of the CCD solid-state imaging device is read by a charge transfer register, a transfer clock for driving the charge transfer register to transfer the signal charge thus read, and a reset pulse for resetting floating diffusion (FD) in an output unit having an FD configuration.

However, with the conventional image reading apparatus having the above-described configuration, when the supply of the drive clock signal CCD-CLK is stopped, the reset pulse imparted to an output unit of the CCD solid-state imaging device is maintained at a high level, so that the output unit is set in a saturated state, and the output signal level of the CCD solid-state imaging device during the standby period is about 7.5 V. On the other hand, if the drive clock signal CCD-CLK is supplied, the reset pulse is imparted to the output unit of the CCD solid-state imaging device as well, and the output is in an active state. Hence, the output signal level of the CCD solid-state imaging device varies centering on a d.c. output bias level of about 5 V.

In other words, when a shift is made from the standby state to a copying-operation state, a step-like potential fluctuation of as much as about 2.5 V occurs in the output signal level of the CCD solid-state imaging device, so that there arise cases where an analog signal processing circuit in a subsequent stage cannot follow that sharp fluctuation in the level. This is because the output of an automatic gain control (AGC) circuit in the analog signal processing circuit is temporarily saturated, and much time is required until the output assumes a stable state. If the set value of the gain in the AGC circuit becomes large, this rise stabilizing time becomes extremely poor, as indicated by the solid line in FIG. 4. For example, in a case where the rise stabilizing time is 0.5 sec. or thereabouts when the set value of the gain is 2.0 times, if the set value of the gain is set to 4.8 times, the rise stabilizing time becomes an extremely long 3.3 sec. or thereabouts.

In the image reading apparatus, when the user depresses a copy start button, the drive clock signal CCD-CLK is simultaneously supplied to the CCD solid-state imaging device, while the movement of a movable section including a carriage and a mirror unit is started, and prescanning is carried out. In this prescanning, processing is carried out including the detection of the presence or absence of the setting of an original to be copied and the size thereof and a discrimination as to whether the original is a black-and-white original or a color original, on the basis of an image read signal after signal processing by the analog signal processing circuit. At this time, if the rise stabilizing time during a copying start is long, as described above, and the rise response period during its transitional period is long, as shown in FIG. 7, and an A/D conversion output is unstable, drawbacks can occur such as that the size of the original cannot be detected, and a faulty discrimination between the black-and-white original and the color original is made.

SUMMARY OF THE INVENTION

The present invention has been devised in view of the above-described circumstances, and it is an object of the present invention to provide an image reading apparatus capable of proceeding to a stable image-reading operation in a short time when reading is started.

To this end, in accordance with the present invention, there is provided an image reading apparatus comprising: a photoelectric conversion element for converting an optical image obtained by applying light to an object into an electrical signal; driving-interrupting means for interrupting the driving of the photoelectric conversion element during a non-reading period when the optical image is not read; and output-signal-level determining means for determining an output signal, which is imparted to a circuit in a subsequent stage of the photoelectric conversion element the driving of which is being interrupted by the driving-interrupting means, to be at a predetermined level.

In the image reading apparatus having the above-described configuration, the driving-interrupting means interrupts the driving of the photoelectric conversion element by stopping the supply of a drive clock signal with respect to the photoelectric conversion element during the standby period, thereby eliminating unnecessary power consumption by the photoelectric conversion element and its drive circuit and the like so as to suppress heat generation. During this standby period, the output-signal-level determining means holds the output signal level of the photoelectric conversion element at a predetermined level, preferably at a level substantially equivalent to the d.c. output bias level of the photoelectric conversion element. Consequently, when the operation proceeds to an image-reading operation after the standby period, a step-like potential fluctuation does not occur in the output signal level of the photoelectric conversion element. Hence, the operation can proceed to a stable image-reading operation in a short time.

The above and other objects, features and advantages of the present invention will become more apparent from the following detailed description of the invention when read in conjunction with the accompanying drawings.

BRIEF DESCRIPTION OF THE DRAWINGS

The above and other objects and features of the present invention will be more apparent from the following description taken in conjunction with the accompanying drawings.

FIG. 3 is a timing chart explaining the operation of the embodiment;

FIG. 4 is a characteristic diagram concerning a set value of an AGC gain with respect to a rise stabilizing time;

DESCRIPTION OF THE PREFERRED EMBODIMENTS

Referring now to the accompanying drawings, a detailed description will be made of an embodiment of the present invention which is applied to a digital copying machine, for example. It should be noted that the present invention is not limited to an application to the digital copying machine, and is applicable to image reading apparatuses at large for reading an image by using a photoelectric conversion element, such as a CCD solid-state imaging device, for converting an optical image obtained by applying light to an object, such as an original, into an electrical signal.

Figure 1:
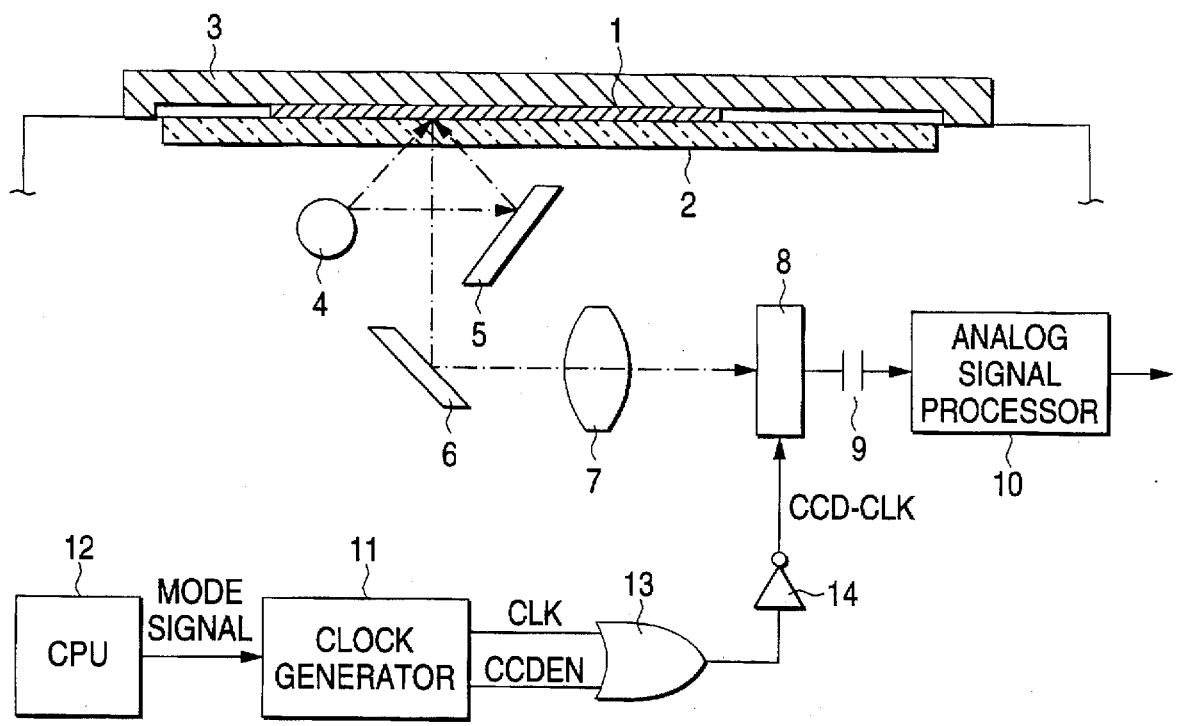
FIG. 1 is a schematic diagram illustrating an embodiment of the present invention.

FIG. 1 is a schematic diagram illustrating an embodiment of the present invention. In FIG. 1, an original 1, i.e., an object to be copied, is placed on platen glass 2, and its reverse side and its periphery are covered with a platen cover 3. Light emitted from an exposure lamp 4 is applied to the original 1 directly and by being reflected by a reflector 5. Reflected light from the original 1 based on the applied light is reflected by a reflecting mirror 6, and forms an image on an imaging plane of a CCD solid-state imaging device 8, i.e., a photoelectric conversion element, by means of an image-forming lens 7. An optical system including the exposure lamp 4, the reflector 5, and the reflecting mirror 6 is mounted on an unillustrated carriage and is movable in the left-and-right direction in the direction, i.e., in a sub-scanning direction. As the CCD solid-state imaging device 8, a line sensor in which pixels are arrayed linearly is used, and scanning in a direction perpendicular to the plane of the drawing, i.e., main scanning, is effected electrically on the CCD solid-state imaging device 8.

Figure 2:
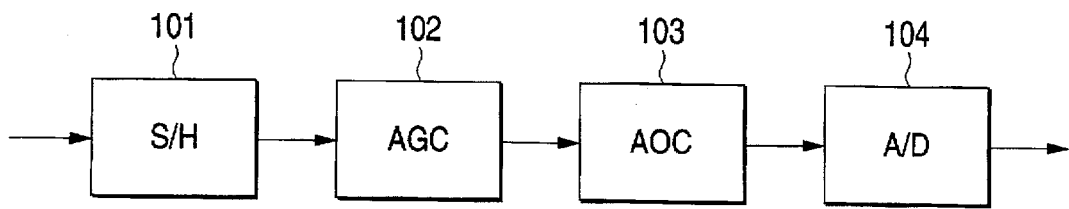
FIG. 2 is a block diagram illustrating an example of the configuration of an analog signal processing circuit.

An output signal from the CCD solid-state imaging device 8 is supplied to an analog signal processing circuit 10 through an a.c. coupling capacitor 9. As an example of a specific configuration of the analog signal processing circuit 10 is shown in FIG. 2, the analog signal processing circuit 10 is comprised of an S/H circuit 101 for sampling/holding (S/H) the output signal from the CCD solid-state imaging device 8, an AGC circuit 102 for adjusting the white level of the output signal from the CCD solid-state imaging device 8 to a reference white level, an automatic offset control (AOC) circuit 103 for adjusting the black level of the output signal from the CCD solid-state imaging device 8 to a reference black level, and an A/D converter 104 for converting an analog signal subjected to such various items of processing into a digital signal. Incidentally, the circuit shown in FIG. 2 illustrates only one example of a specific configuration of the analog signal processing circuit 10, and should not be limited to the same.

A drive clock signal CCD-CLK is imparted to the CCD solid-state imaging device 8 from an external circuit. The drive clock signal CCD-CLK referred to herein is a general term for various clock pulses including a read pulse by which a signal charge stored in each pixel (sensor section) of the CCD solid-state imaging device 8 is read by a charge transfer register, a transfer clock for driving the charge transfer register to transfer the signal charge thus read, and a reset pulse for resetting floating diffusion (FD) in an output unit having an FD configuration. The drive clock signal CCD-CLK is for driving the CCD solid-state imaging device 8. A clock-generating circuit 11 is provided as a clock-supplying means for imparting the drive clock signal CCD-CLK.

The clock-generating circuit 11 generates various clock signals CLK corresponding to drive clock signals CCD-CLK. When a mode signal indicating a standby period when an image is not read is imparted to the clock-generating circuit 11 from a CPU 12, the clock-generating circuit 11 stops the generation of the clock signal CLK, and instead generates a control signal CCDEN which is set at a high level during the standby period. The clock signal CLK and the control signal CCDEN serve as inputs to an OR circuit 13. An output from the OR circuit 13 is inverted by an inverter 14, and is imparted to the CCD solid-state imaging device 8 as its drive clock signal CCD-CLK.

Next, referring to the timing chart shown in FIG. 3, a description will be given of the operation of the circuit having the above-described configuration. First, on the basis of a command from a system controller (not shown), the CPU 12 imparts to the clock-generating circuit 11 a low-level mode signal in the case of a standby mode in which the image is not read, and a high-level mode signal in the case of an operation mode in which the image is read. On the basis of the mode signal, in the standby mode the clock-generating circuit 11 generates the high-level control signal CCDEN and stops the generation of the clock signal CLK, while in the operation mode the clock-generating circuit 11 generates the low-level control signal CCDEN and generates the clock signal CLK.

Then, in the OR circuit 13, the high-level control signal CCDEN is passed in the standby mode, while the clock signal CLK is passed in the operation mode, and the respective signal is inverted by the inverter 14. As a result, the drive clock signal CCD-CLK imparted to the CCD solid-state imaging device 8 is held at a low level in the standby mode (standby period), and is set to its proper clock signal on a start of copying. Thus, since the supply of the drive clock signal CCD-CLK is stopped during the standby period, unnecessary power consumption by a drive circuit including the CCD solid-state imaging device 8 and the inverter 14 is eliminated, thereby making it possible to suppress heat generation.

In addition, during the standby period, the clock-generating circuit 11 generates the high-level control signal CCDEN, and continues to hold the drive clock signal CCD-CLK at a low level, with the result that a reset pulse imparted to the output unit of the CCD solid-state imaging device 8 is also held at the low level. Hence, the output unit is set in a reset state, and therefore maintains a nonsaturated state. Consequently, the output signal level of the CCD solid-state imaging device 8 is held at about 5 V, and is set at substantially the same level as the d.c. output bias level of the CCD solid-state imaging device 8 during a normal operation. That is, in this embodiment, the clock-generating circuit 11 is jointly provided with the function of an output-level holding means for holding the output signal level of the CCD solid-state imaging device 8 at the d.c. output bias level during the standby period.

Since the output signal level of the CCD solid-state imaging device 8 is substantially held at the d.c. output bias level during the standby period, a step-like potential fluctuation does not occur in the output signal level of the CCD solid-state imaging device 8 when a shift is made from the standby mode to the copying operation mode. Therefore, even if the set gain of the AGC circuit 102 (see FIG. 2) in the analog signal processing circuit 10 is large, the output is not saturated, and the rise response characteristic can be improved substantially. That is, as indicated by the broken line in FIG. 4, the rise stabilizing time is about 0.05 sec. or less up to a point where the set value of the gain in the AGC circuit 102 is 4.9 times, and the rise stabilizing time is 0.35 sec. or thereabouts even if the setting of the gain is set to 7.8 times. Thus, it can be appreciated that a substantial improvement is made in comparison with the conventional example indicated by the solid line.

As described above, since the rise response characteristic can be improved substantially, the operation can proceed to a stable image-reading operation in a short time. As is apparent from FIG. 3, since the A/D conversion output immediately assumes a stable state, in prescanning which is carried out immediately after proceeding to the copying operation mode, processing can be positively carried out including the detection of the presence or absence of the setting of the original 1 and the size thereof and a discrimination as to whether the original 1 is a black-and-white original or a color original, on the basis of the image read signal after signal processing by the analog signal processing circuit 10. Further, in the analog signal processing circuit 10, it is possible to accurately effect the gain control by the AGC circuit 102 and the offset control by the AOC circuit 103.

Although in the above-described embodiment the output signal level of the CCD solid-state imaging device 8 is held at a level substantially equivalent to its d.c. output bias level during the standby period, even if the output signal level is not necessarily set to a level substantially equivalent to the d.c. output bias level, the rise response characteristic during a copying start can be improved over the conventional example by setting the output signal level to a level within an ordinary output range. However, it is preferable to set the output signal level substantially to the d.c. output bias level since a step-like potential fluctuation does not occur in the output signal level of the CCD solid-state imaging device 8 when a shift is made from the standby mode to the copying operation mode.

Figure 5A:
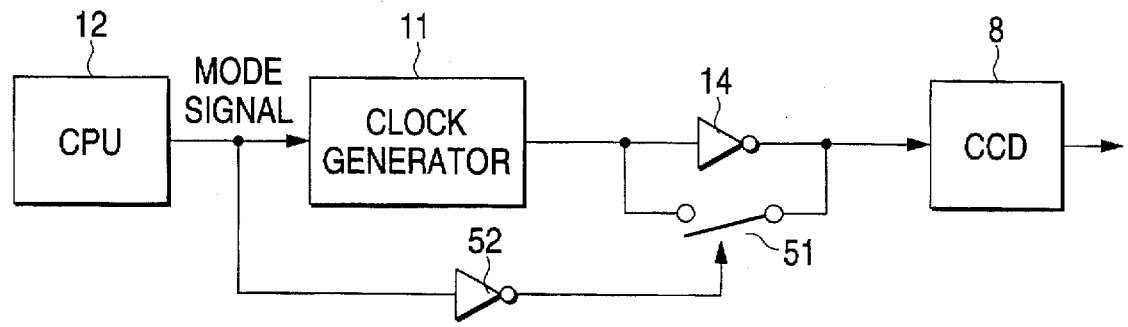
FIGS. 5A and 5B are block diagrams illustrating modifications of the present invention.
Figure 5B:
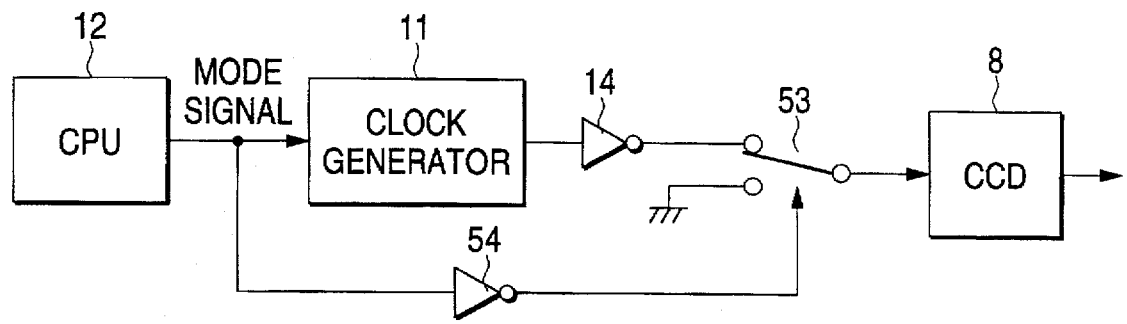

In addition, although the configuration provided in the above-described embodiment is such that, by jointly using the clock-generating circuit 11 as the output-level holding means, during the standby period the high-level control signal CCDEN is generated, and is imparted to the CCD solid-state imaging device 8 via the OR circuit 13 and the inverter 14 so as to hold the output signal level of the CCD solid-state imaging device 8 at the d.c. output bias level, the configuration is not limited to the same. For example, a configuration may be provided such that, as shown in FIG. 5A, an analog switch 51 is connected in parallel to the inverter 14, and the analog switch 51 is set in an on state during the standby period on the basis of the mode signal outputted from the CPU 12 and inverted by an inverter 52, so as to bypass the inverter 14. Still alternatively, a configuration may be provided such that, as shown in FIG. 5B, an analog switch 53 is provided on the input side of the CCD solid-state imaging device 8, and the analog switch 53 is controlled in such a manner as to be switched over on the basis of the mode signal outputted from the CPU 12 and inverted by an inverter 54, whereby the output level of the inverter 14 is selected during the copying operation period, whereas the ground level is selected during the standby period. In either modification, since the drive clock signal CCD-CLK of the CCD solid-state imaging device 8 can be held at the low level during the standby period, the output signal level of the CCD solid-state imaging device 8 can be held at the d.c. output bias level.

Figure 6:
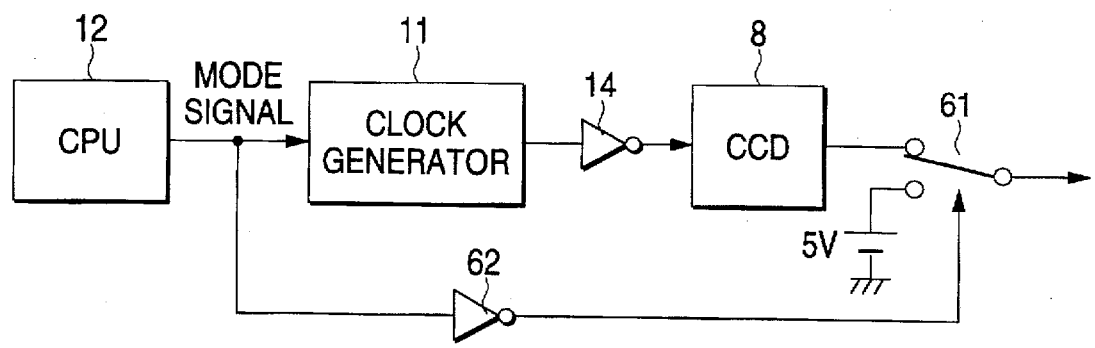
FIG. 6 is a block diagram illustrating another modification of the present invention.
Figure 7:
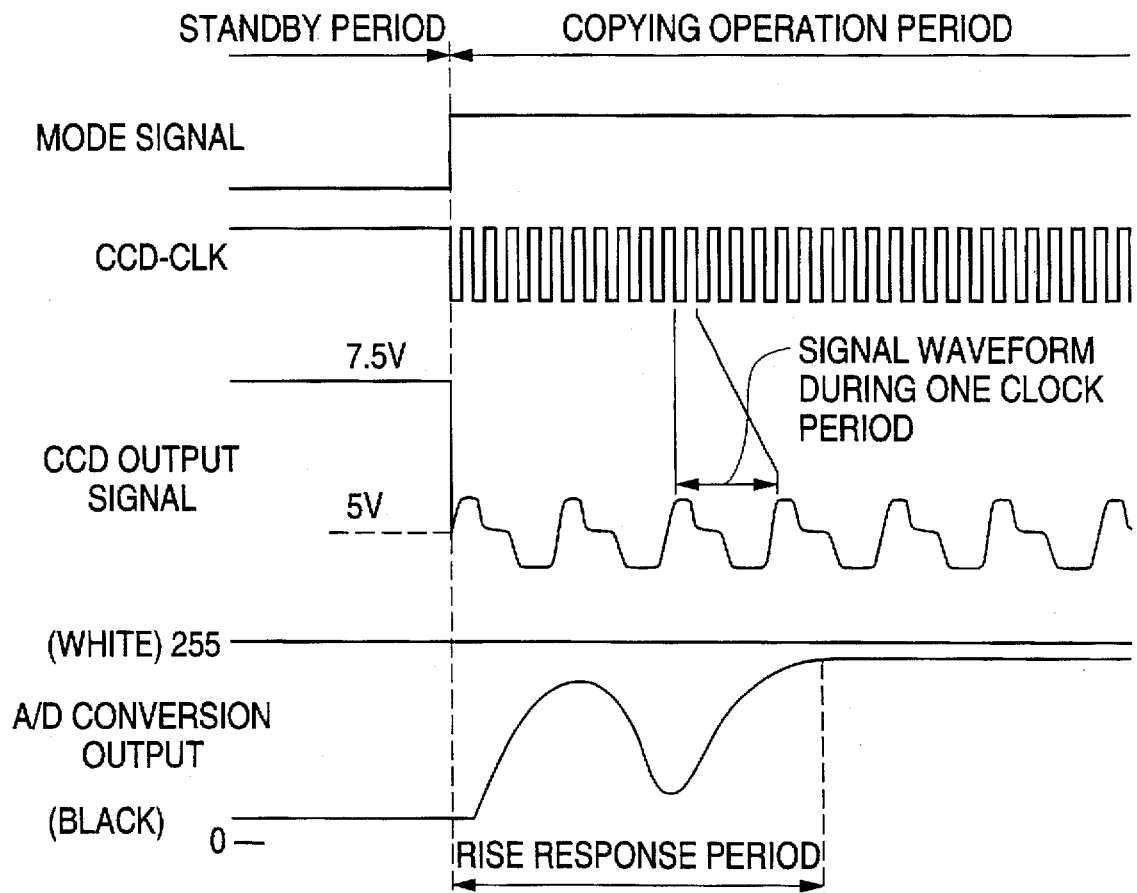
FIG. 7 is a timing chart explaining the operation of the prior art.

Furthermore, it is possible to provide the output-level holding means on the output side of the CCD solid-state imaging device 8. Namely, a configuration may be provided such that, as shown in FIG. 6, an analog switch 61 is provided on the output side of the CCD solid-state imaging device 8, and the analog switch 61 is controlled in such a manner as to be switched over on the basis of the mode signal outputted from the CPU 12 and inverted by an inverter 62, whereby the output signal level of the CCD solid-state imaging device 8 is selected during the copying operation period, whereas a predetermined level (e.g., 5 V) set in correspondence with the d.c. output bias level is selected during the standby period. In the case of this modification as well, the output signal level of the CCD solid-state imaging device 8 can be held at the d.c. output bias level during the standby period. However, since there are variations in the d.c. output bias level of the CCD solid-state imaging device 8 among devices, in the case of a device whose d.c. output bias level is, for example, 6 V, if the output signal level of the CCD solid-state imaging device 8 during the standby period is fixed at, for example, 5 V, a potential fluctuation of 1 V occurs in the output signal level of the CCD solid-state imaging device 8 when the mode is shifted to the copying operation mode.

For this reason, rather than the method of fixing the output signal level forcibly at a predetermined level on the output side of the CCD solid-state imaging device 8, the method of holding the output signal level of the CCD solid-state imaging device 8 at a predetermined level by providing the output-level holding means on the input side of the CCD solid-state imaging device 8 and by holding the drive clock signal CCD-CLK of the CCD solid-state imaging device 8 at a low level during the standby period is more preferable since it is capable of coping with variations in the d.c. output bias level of each individual device and variations in the d.c. output device level due to a temperature change.

As described above, in accordance with the present invention, in the image reading apparatus which is arranged such that the supply of the drive clock signal to the photoelectric conversion element is stopped during the standby period when an image is not read, the output signal level of the photoelectric conversion element is held at a predetermined level during the standby period. Accordingly, it is possible to minimize a transient fluctuation of the output signal level of the photoelectric conversion element when the supply of the drive clock signal is started, so that the operation can proceed to a stable image-reading operation in a short time after the resumption of the supply of the clock.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image reading apparatus, comprising:

means for applying light to an object to obtain an optical image;

photoelectric conversion means for converting the optical image from said applying means into an electrical signal;

means for driving said photoelectric conversion means;

driving-interrupting means for interrupting the driving of said photoelectric conversion means by said driving means, said driving-interrupting means stopping the supply of a clock signal imparted to said photoelectric conversion means during a non-reading period when the optical image is not read; and output-signal-level determining means for determining an output signal, which is imparted to a circuit in a subsequent stage of said photoelectric conversion means, to be at a predetermined level by setting to a low level a reset pulse for the clock signal the supply of which is stopped, and imparting the same to said photoelectric conversion means.

2. An image reading apparatus according to claim 1, wherein the low level is a ground level.

3. An image reading apparatus according to claim 1, further comprising:

voltage-supplying means for supplying a voltage of the low level, wherein the reset pulse is the voltage supplied from said voltage-supplying means.

* * * * *